US007836189B2

(12) United States Patent
Sun et al.

(10) Patent No.: US 7,836,189 B2
(45) Date of Patent: Nov. 16, 2010

(54) MULTIPLE SIMULTANEOUS WIRELESS CONNECTIONS IN A WIRELESS LOCAL AREA NETWORK

(75) Inventors: Sheng Sun, Kanata (CA); John Dunning, Nepean (CA)

(73) Assignee: Avaya Inc., Basking Ridge, NJ (US)

( * ) Notice: Subject to any disclaimer, the term of this patent is extended or adjusted under 35 U.S.C. 154(b) by 1397 days.

(21) Appl. No.: 10/764,696

(22) Filed: Jan. 26, 2004

(65) Prior Publication Data

US 2005/0198337 A1    Sep. 8, 2005

(51) Int. Cl.
G06F 15/16 (2006.01)
(52) U.S. Cl. .................. 709/227; 709/230; 455/436
(58) Field of Classification Search ............. 709/227, 709/230; 455/436, 411, 522; 370/328, 355
See application file for complete search history.

(56) References Cited

U.S. PATENT DOCUMENTS

| | | | | |
|---|---|---|---|---|
| 6,360,264 | B1* | 3/2002 | Rom | 709/227 |
| 6,618,005 | B2* | 9/2003 | Hannah et al. | 342/465 |
| 6,990,343 | B2* | 1/2006 | Lefkowitz | 455/436 |
| 7,058,030 | B2* | 6/2006 | Ekl et al. | 455/436 |
| 7,414,992 | B2* | 8/2008 | Hirsbrunner et al. | 455/437 |
| 2002/0085719 | A1* | 7/2002 | Crosbie | 455/436 |
| 2002/0176415 | A1 | 11/2002 | Holden et al. | |
| 2003/0043773 | A1 | 3/2003 | Chang | |
| 2003/0054818 | A1* | 3/2003 | Bahl et al. | 455/432 |
| 2003/0108063 | A1 | 6/2003 | Joseph et al. | |
| 2003/0169716 | A1 | 9/2003 | Saito | |
| 2004/0121772 | A1* | 6/2004 | Rue | 455/436 |
| 2004/0171402 | A1* | 9/2004 | Tamaki et al. | 455/522 |
| 2004/0218580 | A1* | 11/2004 | Bahl et al. | 370/350 |
| 2004/0224690 | A1* | 11/2004 | Choi et al. | 455/436 |
| 2005/0117524 | A1* | 6/2005 | Lee et al. | 370/254 |
| 2006/0291455 | A1* | 12/2006 | Katz et al. | 370/355 |

OTHER PUBLICATIONS

ANSI/IEEE Std 802.11, 1999 Edition, *Part 11: Wireless LAN Medium Access Control (MAC) and Physical Layer (PHY) Specifications* (513 pages).

* cited by examiner

*Primary Examiner*—Ramy M Osman
(74) *Attorney, Agent, or Firm*—Anderson Gorecki & Manaras LLP

(57) ABSTRACT

Multiple simultaneous associations with Wireless Access Points (WAPs) may be formed by a given wireless client to enable handoffs between the WAPs to be accelerated and, optionally, to enable both WAPs to provide simultaneous wireless services to the wireless client. Upon forming a primary association with one WAP the wireless client scans for beacon signals from other WAPs. Upon detecting another WAP, the wireless client transmits a Request To Send (RTS) message to the new WAP indicating the identity of the primary WAP. The wireless client may also identify the new WAP to the primary WAP using a RTS message. The primary and secondary WAPs exchange information so that, in the event of a handoff, the required information has already been shared with the new WAP. Optionally, the several WAPs may provide simultaneous service to the wireless client.

8 Claims, 3 Drawing Sheets

MULTIPLE SIMULTANEOUS WIRELESS CONNECTIONS IN A WIRELESS LOCAL AREA NETWORK

BACKGROUND OF THE INVENTION

1. Field of the Invention

The present invention relates to communication networks and, more particularly, to a method and apparatus for supporting multiple simultaneous wireless connections in a wireless local area network.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

In a typical wireless network, wireless access points provide wireless access to wireless clients. Wireless networks rely on the propagation of wireless signals which may be affected by numerous environmental factors. For example, changing environmental conditions and the activities of adjacent wireless access points can affect the reach of the signal and the bandwidth available over a channel on the wireless signal. Especially in ad-hoc networks, where the placement of wireless access points is not extensively planned and may not be extensively centrally managed, and where the wireless access points themselves might be mobile, the signal characteristics may vary considerably from place to place and temporally within the same place.

Conventionally, wireless standards generally require a wireless client to be associated with no more than one wireless access point. Thus, a wireless client will associate with a given wireless access point and communicate through that wireless access point until signal characteristics deteriorate to the point where the wireless client is required to search for a new access point on the network. The wireless client will then scan the signal channels to find the next available wireless access point and make a new association with the selected wireless access point.

For example, when a wireless client is required to handoff to another primary wireless access point, the wireless client may scan a beacon (output by the wireless access points) to find an adjacent wireless access point that has a relatively strong signal. Any number of methods may be used to select an available wireless access point. The wireless LAN client will then try to send an association request and authentication request towards the new primary wireless access point. Upon receipt of a reply from the new wireless access point that the association and authentication has been accepted, the wireless LAN client will initiate a Request To Send (RTS) message to the new associated wireless access point. Once the wireless access point has the capacity to allocate bandwidth to this specific request, a Clear To Send (CTS) message is sent back to the requesting wireless client indicating that the wireless client is clear to start communicating through the wireless access point.

Unfortunately, the handoff process may take up to or in excess of 100 ms which, for real time applications such as audio and video transmissions and certain other data applications, may exceed acceptable limits. Accordingly, it would be advantageous to provide a faster mechanism for facilitating hand-offs in a wireless local area network.

SUMMARY OF THE INVENTION

The present invention overcomes these and other drawbacks by providing a method and apparatus for supporting multiple simultaneous wireless connections in a wireless local area network. According to an embodiment of the invention, a wireless client is configured to associate simultaneously with multiple wireless access points to enable fast handoffs to be performed and, optionally, to enable faster wireless service to be provided to the wireless client from the multiple wireless access points. Information related to the connections, sessions, and flows, may be exchanged between the wireless access points so that, upon handoff from one wireless access point to the second wireless access point, continuity may be maintained. Optionally, multiple access points may be designated as primary wireless access points for different flows, sessions, or for particular types of communications. Designating several wireless access points as primary wireless access points enables data to be passed to the wireless client from several locations on the network thus increasing the data throughput to the wireless client.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

A method and apparatus for supporting multiple simultaneous wireless connections in a wireless local area network enables wireless clients to associate with multiple wireless access points to increase data throughput and to accelerate handoffs between the wireless access points. According to an embodiment of the invention, a wireless client is configured to associate simultaneously with multiple wireless access points to enable fast handoffs to be performed and, optionally, to enable faster wireless service to be provided to the wireless client from the multiple wireless access points. Information related to the connections, sessions, and flows, may be exchanged between the wireless access points so that upon handoff from one wireless access point to the second wireless access point, continuity may be maintained. Optionally, the simultaneous associations may be used to support multiple flows with each of the several associated wireless access points to provide improved and/or diversified services to the wireless client.

Figure 1:
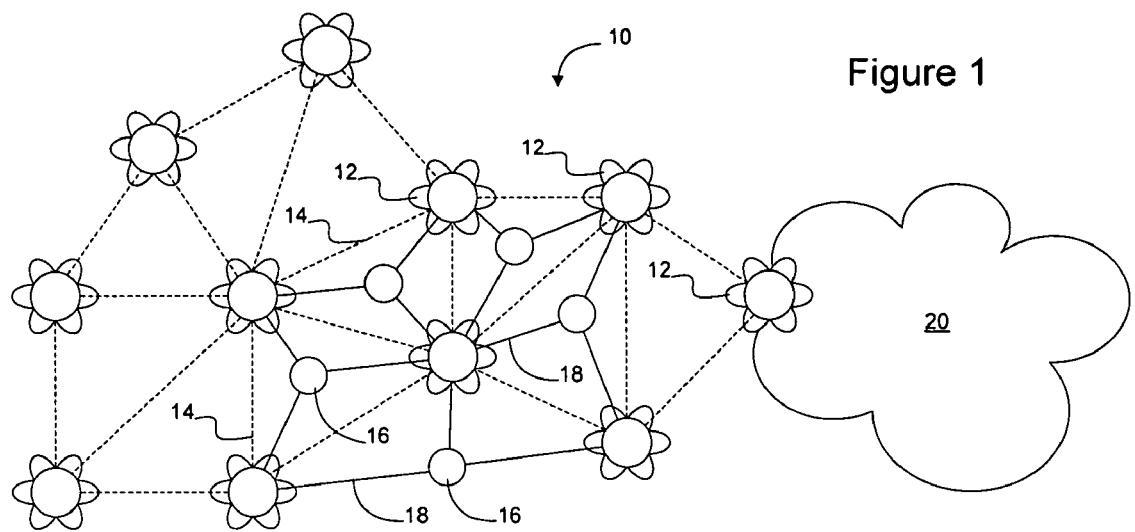
FIG. 1 is a functional block diagram a portion of an example wireless communication network.

FIG. 1 illustrates a portion of a communication network 10 in which wireless access points 12 are interconnected in a mesh network topology by wireless or wired links 14 (illustrated in dashed lines in FIG. 1). A mesh topology, as that term is used herein, enables many-to-one connectivity to provide a multiplicity of paths through the network. Mesh networks are advantageous in that they enable a given connection to be carried on a number of distinct paths through the network instead of requiring the connection to be carried over one or a limited number of paths through the network. Although FIG. 1 illustrates an implementation of a communication network in which the wireless access points are interconnected in a mesh network topology, the invention is not limited to this embodiment as other network topologies may be used as well.

The wireless network 10 may be formed in any convenient fashion. In one embodiment, the network may be formed as an ad-hoc network in which extensive planning is not performed and wireless access points are added as needed. Ad-hoc networks, especially in a mesh topology, are advantageous in that less centralized administration is required to organize and support the network. The network is not limited in this manner, however, as other types of networks may be used as well. The wireless access points may also be fixed or mobile, and the invention is not limited to a network including fixed wireless access points.

Figure 2:
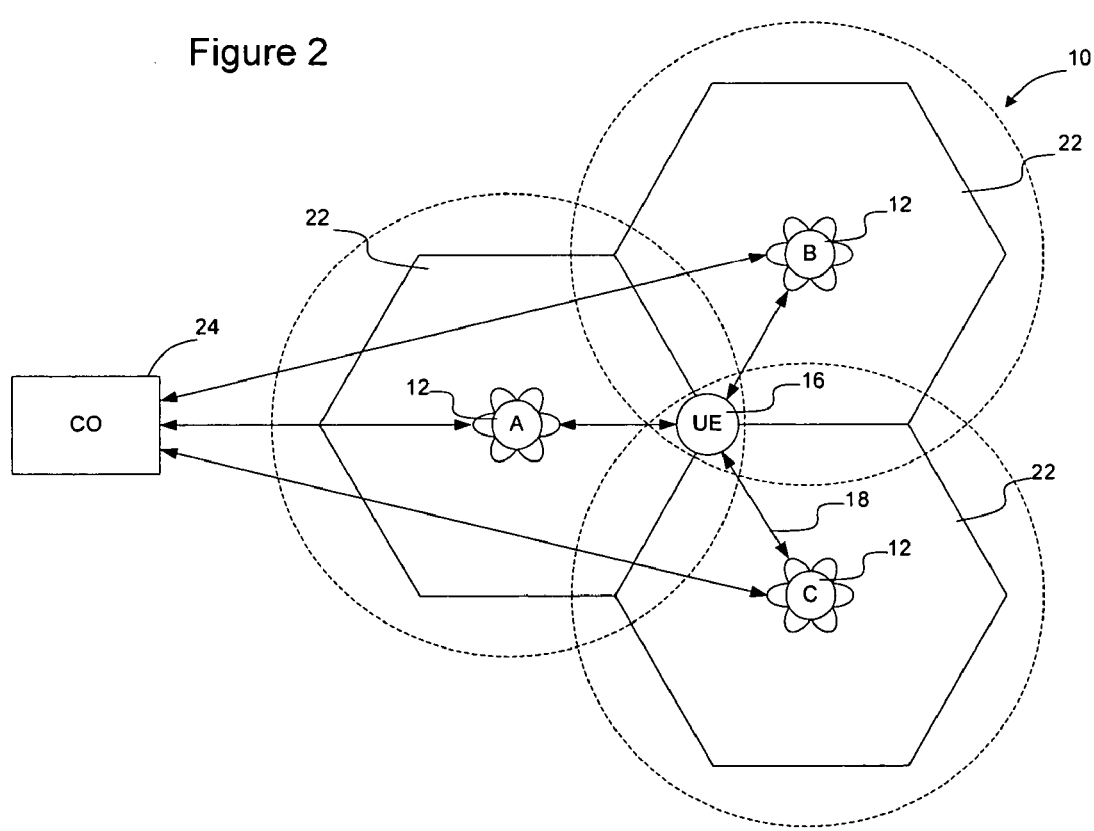
FIG. 2 is a functional block diagram of a portion of the communication network of FIG. 1 illustrating several adjacent wireless cells in greater detail.

At least some of the wireless access points 12 provide network access to wireless clients 16 over wireless links 18 (illustrated in solid lines in FIG. 1) to enable the wireless clients to have access to a network 20. The network 20 may be a public network such as the Public Switched Telephone Network (PSTN) or Internet. Alternatively, the network 18 may be a corporate network, residential network, or other private network. The invention is not limited by the type of network 20 to which the wireless access points ultimately connect. Optionally, as illustrated in FIG. 2 below, a central office or other facility may interface the network of wireless access points to the network 20.

The wireless access points in the network 10 may be configured to communicate between each other using one wireless technology and may communicate with wireless clients using another wireless technology. These wireless technologies may be distinguished by frequency or protocol. Examples of several different wireless technologies that may be used include one of the Institute of Electrical and Electronics Engineers (IEEE) 802.11x wireless communication protocols (e.g. 802.11a, 802.11b, or 802.11g), one of the IEEE 802.16x protocols, the Universal Mobile Telecommunication System (UMTS) wireless communications protocol or another cellular protocol, or an emerging or to be developed protocols. The wireless technologies may also include microwave, free space optics, and other types of communication technologies that do not rely on physical links (such as wires and optical fibers) for the transmission of data.

Although in this application a wireless-based network will be described, and the nodes will be discussed as communicating with each other and with end users using various wireless protocols, the invention is not limited in this regard. Rather, the invention may be used more broadly with other types of communication technology, such as microwave, infrared, acoustic, and numerous other types of wireless communication technologies.

As shown in FIG. 1, a given wireless client 16 may be located in a region of the network where it is possible for that wireless client to communicate with more than one wireless access point. In this instance, the wireless client may select one wireless access point, form a primary association with that wireless access point, and obtain access to the network 10/20 through that wireless access point. Optionally, according to another embodiment of the invention, the wireless client may form multiple associations with several wireless access points and obtain access through one or more wireless access points simultaneously. Then, when signal characteristics change such that it is desirable to form a primary affiliation with a different wireless access point, the multiple simultaneous affiliations with adjacent wireless access points enable handoffs between wireless access points to occur quickly and seamlessly.

FIG. 2 illustrates a portion of the network 10 in which three adjacent wireless access points 12 are each configured to provide wireless service to a coverage area 14 referred to herein as a cell. Due to the nature of wireless communications networks, transmissions from adjacent wireless access points 12 commonly overlap each other (as indicated by the dashed circles on FIG. 1) so that there is geographical coverage continuity between adjacent cells 22. While three adjacent cells have been shown in the illustrated portion of the network to help explain one or more embodiments of the invention, a typical network would be likely to include many more wireless access points providing service to many more cells 22.

The wireless client 16 in FIG. 2 is illustrated as being in an overlapping region between two or more adjacent wireless access points. Depending on the configuration of the network, the region of overlap may be relatively small or relatively larger. Additionally, since the signals from the wireless access points don't precisely stop propagating at a particular defined boundary, but rather decay over distance, the relative intensity of the cells may switch over time. In the following discussion, the "overlap regions" will be referred to as the areas where the wireless client would be able to communicate with more than one wireless access point. While the signal from one wireless access point may be much stronger than the signals from other wireless access points in the overlap region, and it may be natural for the wireless client to associate with the wireless access point providing the signal with better characteristics, the wireless client will still be considered to be in an overlap region where it is possible to also receive data over signals from the other wireless access points.

The wireless access points 12 communicate with a central office 24 or other centralized source of data to enable voice conversations and data transmissions to take place between the higher bandwidth services 20 interfaced by the central office 24 and the wireless access points. The central office may interface the Internet, Public Switched Telephone Network (PSTN), or other communication network. Transmission between the central office 24 and the wireless access points 12 may take place over a passive optical network, a wireless network, or any other type of network in a conventional manner. The invention is not limited to any particular implementation of how the wireless access points and central office are interconnected.

When an user is in an overlap region between two or more wireless access points, it may be possible for the user to communicate with two or more of the adjacent wireless access points 12. For example, assume that wireless access point-A is the primary wireless access point for the wireless client illustrated in FIG. 2. In this example it may also be possible for the wireless client to communicate with wireless access point B or wireless access point C should wireless access point A become unavailable due to relative movement of the wireless client and wireless access point A, or due to changing signal characteristics or environmental characteristics. Accordingly, the wireless client may be required, at some point in time, to switch primary wireless access point affiliation and continue communicating on the wireless network through wireless access point-B or wireless access point-C. Switching primary wireless access point affiliation will be referred to herein as a handoff.

Figure 3:
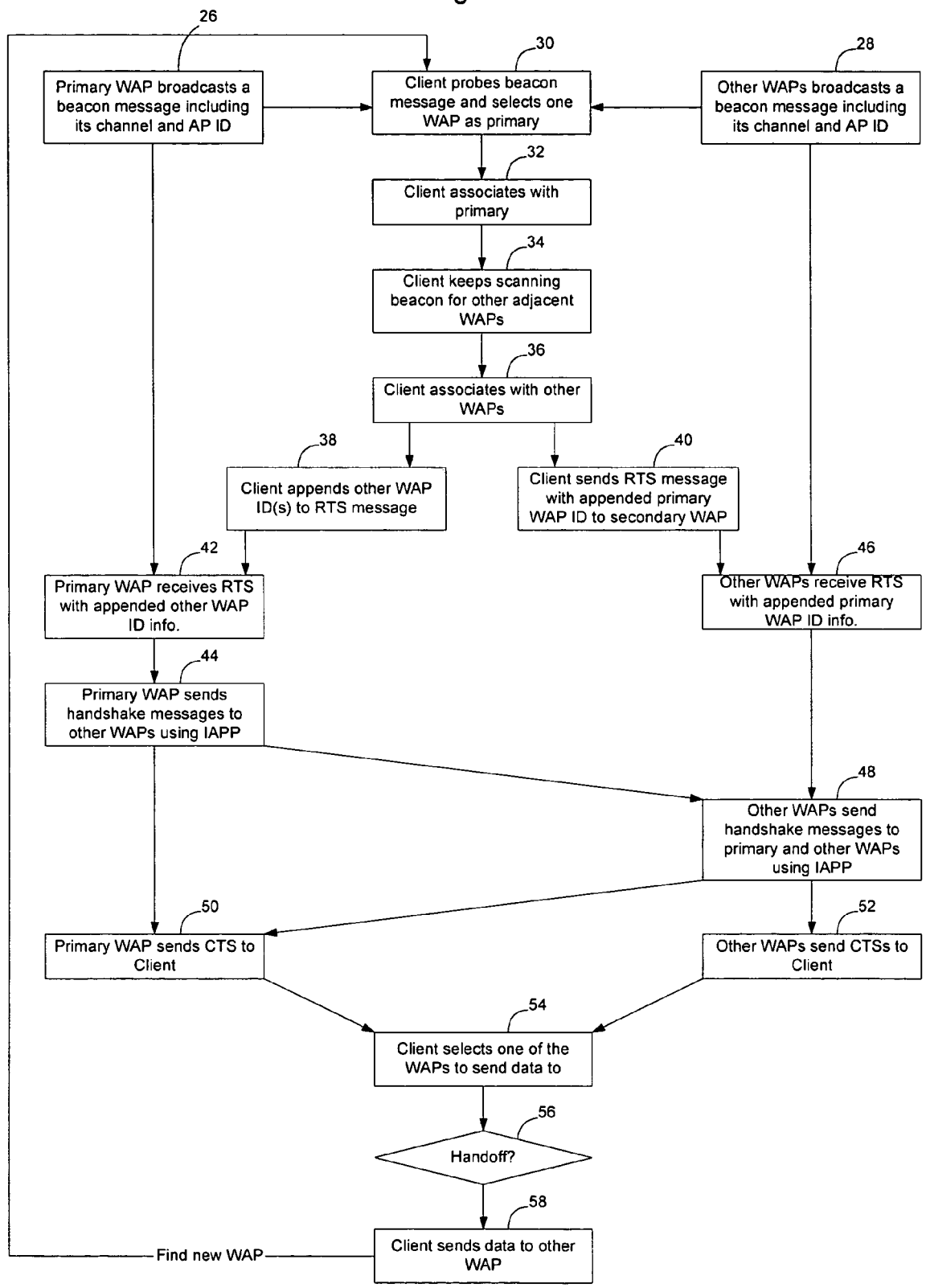
FIG. 3 is a flow chart illustrating a process of implementing multiple simultaneous wireless connections in a wireless local area network.

According to an embodiment of the invention, a wireless client may form multiple affiliations with multiple wireless access points at the same time so that hand-offs between wireless access points may take place quickly and seamlessly. FIG. 3 illustrates one example of a process that may be used to enable wireless clients to associate with multiple wireless access points to enable handoffs between the wireless access points to happen more quickly. The process illustrated in FIG. 3 may be implemented by network participants such as the wireless access points, wireless clients, and the central office, using appropriately configured software, hardware, firmware, or other implementations. Devices configured to implement the embodiments of the invention are discussed in greater detail below in connection with FIGS. 4 and 5.

As shown in FIG. 3, when a wireless client seeks to associate with multiple wireless access points simultaneously, the wireless client probes the beacon messages issued by the wireless access points to select a wireless access point as the primary wireless access point (30). Beacon messages are conventionally produced by wireless access points to enable wireless clients to locate the wireless access points on a wireless network. While in this embodiment there is one primary wireless access point, the wireless client may select different primaries for different types of communications or may in fact have several primary wireless access points. As used herein, the term primary wireless access point will be used to refer to a wireless access point that is actively providing communication services to the wireless client, and the term secondary wireless access point will be used to refer to a wireless access point that has information relating to a wireless client but is not currently actively providing communication services to the wireless client. For example, one wireless access point may be the primary wireless access point for voice communications with the wireless client and another wireless access point may be the primary wireless access point for data communications with the wireless client. Thus, while the wireless client has selected one wireless access point as its primary wireless access point in this example, the invention is not limited in this manner.

The client then forms an association with the primary wireless access point in a conventional manner (32). However, the wireless client, as noted above, would like to associate with multiple wireless access points simultaneously. Accordingly, the wireless client according to an embodiment of the invention continues to scan for beacon signals to locate other wireless access points with which it may associate (34). The wireless client may select every beacon signal received or, optionally, may discern between received beacon signals and select a predetermined number of wireless access points in the vicinity or to select only beacon signals having predetermined characteristics as coming from eligible wireless access points.

Once the client has located one or more other wireless access points with which to associate, it begins a process of associating with the other wireless access points while maintaining its affiliation with the primary wireless access point (36). Specifically, in the example illustrated in FIG. 3, the client notifies the primary wireless access point of the identity of the other wireless access point(s) by appending the other wireless access point identification information to a modified version of request-to-send (RTS) message, and sends that RTS message to the primary wireless access point (38). Additionally, the wireless client notifies the second or other set of wireless access points of its intention to form a secondary affiliation with them, for example by sending a RTS message to the secondary wireless access points and including in that RTS message identification information associated with the primary wireless access point (40).

When the primary wireless access point receives the notification of the secondary wireless access point(s), for example upon receipt of the RTS message with included secondary wireless access point identification information (42), the primary wireless access point sends a handshake message to each of the other wireless access points (44). Similarly, when the secondary wireless access points receive the notification of the wireless client's intention to form a secondary affiliation (46) they will send a handshake message to the primary wireless access point (48).

The order of generation of the handshake messages may be configured in a number of different ways. For example, the primary wireless access point may be configured to initiate a protocol exchange with the secondary wireless access point(s) by generating the first handshake message. Alternatively the secondary wireless access points may be configured to initiate a protocol exchange with the primary wireless access point by generating the first handshake message. Still alternatively, the wireless access points may all be configured to generate handshake messages as soon as they are informed of the wireless client's intention to form a secondary affiliation without regard as to which wireless access point is to be considered the primary and which is to be considered the secondary wireless access point. The invention is not limited by the particular order of generation of handshake messages in the protocol exchange.

The handshake messages serve to exchange identification information, state information associated with flows addressed to the wireless client or on which the wireless client is participating, and other information that may be required to be exchanged between wireless access points in an ordinary handoff between wireless access points. The handshake messages may also be used to coordinate between the wireless access points when more than one wireless access point is to be considered a primary wireless access point for that wireless client. According to one embodiment of the invention, the information is exchanged between the wireless access points using an extension to a conventional protocol such as Inter Access Point Protocol (IAPP), a protocol that is specified to be used to perform hand-offs in the 802.11x wireless communication space. The invention is not limited to using IAPP or a derivative of IAPP, however, as other protocols such as Spanning Tree Protocol (STP) or Inter-Switch Trunk Protocol (IST), or other existing or to be developed protocols, may be used to exchange this information as well.

Once the appropriate information has been exchanged between the wireless access points, the wireless access points will notify the wireless client that the secondary affiliation(s) or additional primary affiliation(s) have been successfully established. This may be done in a number of ways. In the embodiment illustrated in FIG. 3, this is accomplished by the primary wireless access point sending a Clear-To-Send (CTS) message to the wireless client (50) and by having the other wireless access points send CTS messages to the wireless client (52). Receipt of a CTS message from a wireless access point is generally interpreted by the wireless client that the wireless client is able to communicate through that wireless access point and direct communications to that wireless access point. The CTS messages may identify channel information to be used for communications with that wireless access point, and optionally identify other information such as encryption information to be used on the channel. Other additional information may be included as well and the invention is not limited by the type of information contained in the CTS message. Where the attempted affiliation does not succeed, this information may be communicated to the wireless client as well.

Receipt by the wireless client of multiple CTS messages from multiple wireless access points thus provides the wireless client with the ability to direct communications to either of the several wireless access points or multiple wireless access points simultaneously. Specifically, the wireless client has formed an affiliation with two or more wireless access points, and each of the wireless access points has obtained flow information associated with the communication sessions associated with the wireless access point and network level information sufficient to enable it to participate and host communications with the wireless client.

Thus, the wireless client may select one of the wireless access points and send data to that wireless access point (54). It is immaterial whether that wireless access point is the primary wireless access point or the secondary wireless access point since both wireless access points are equally capable of handling communications to the wireless client. However, where one of the wireless access points such as the primary wireless access point is designated as the care-of address for communications directed toward the wireless client, it may be preferable for the wireless client to continue to select the primary wireless access point preferentially, although the invention is not limited to this embodiment.

When it becomes more desirable to pass communications through a secondary wireless access point so that the current secondary wireless access point is to become a primary wireless access point, a handoff is required and communications with the wireless client should be handled by another wireless access point. Accordingly, upon determination by the wireless access point or the wireless client that handoff is desirable (56) the client begins sending data to one of the wireless access points with which a secondary affiliation has been established (58). Where the primary wireless access point determines that the signal characteristics are unacceptable, the wireless access point may instruct the wireless client to seek to switch the primary association to another of the wireless access points. Where the wireless client is the participant that determines that a handoff is required, the wireless client may seek to switch the primary association to another of the wireless access points. In either instance, the wireless client begins to send data to the new primary wireless access point (58) whereupon the new primary wireless access point will handle all or a designated aspect communications for the wireless client.

At the network level, there are many possible ways of providing multiple routes through the network to the wireless client that may allow the simultaneous association of the wireless client through different wireless access points. For example, optionally multiple paths through the network or a virtual routing group may be used to accommodate the multiple associations with multiple wireless access points. The invention is thus not limited to a particular way of handling the multiple associations and, hence, potential multiple routes through the network to the wireless client at the network level. One possible conventional approach for handling address management in a wireless network is commonly referred to as Mobile IP. Mobile IP generally routes information through a network by addressing the information for a mobile client to a care-of address.

Where a single care-of address affiliation is required to be maintained with the central office or other network construct on the public network 20, the new primary wireless access point may register itself as the new care-of address with the home address to enable it to received communications directed toward the wireless client. Optionally, where the wireless access points are connected in a mesh network configuration, for example as illustrated in the network shown in FIG. 1, the old primary wireless access point may serve as the care-of address until the home address is able to be updated or notified of the handoff between the wireless access points, or until the new primary wireless access point moves beyond the range of the primary wireless access point.

Numerous other schemes may be used to manage the multiple associations on the network as well, whether the multiple access points are in the same subnet or different subnets. For example, in an other embodiment, the wireless client may obtain two or more IP addresses, one of which may be associated with the primary wireless access point channel and the other of which may be associated with the secondary access point channel. This solution may work particularly well where the two access points are not on the same subnet. When the wireless client changes associations between the two access points, the client may mark the IP address associated with the secondary access point as the primary IP address. Whenever the wireless client moves to another subnet or associates with a wireless access point on a new subnet, it may access a Dynamic Host Control Protocol (DHCP) server to obtain a new secondary IP address on the new subnet. By maintaining multiple IP addresses on the different subnets communications may be transferred from one access point to the new access point simply by changing the IP addresses. Another scheme would be simply let the IP address always correspond to the primary wireless access point at the point of association. Accordingly, there are multiple processes that may be used to accommodate simultaneous adjacencies with multiple wireless access points at the network level and the invention is not limited to any particular embodiment.

Upon handoff, or at any other stage of the process, the wireless client may seek to make new affiliations with other adjacent wireless access points. By continuously trying to establish new affiliations with neighboring wireless access points until reaches it's full capacity (i.e. until the wireless client is not able to form additional affiliations), the wireless client may maintain a set of wireless access point affiliations from which to choose should it become desirable to perform a handoff from one wireless access point to another wireless access point or to have more than one primary wireless access point. According to embodiments of the invention, the simultaneous multiple affiliations may accelerate handoffs between wireless access points by pre-sharing state, flow, and other information between the wireless access points and by enabling the wireless access points to establish network level connectivity on behalf of the wireless client, should the wireless client perform a handoff or seek to simultaneously communicate with more than one of the wireless access points.

During synchronization process, the several wireless access points may exchange several types of information. For example, the wireless access points may exchange virtual switching group ID(s) where virtual switching groups are being used. In this embodiment, a virtual switching group is formed based on the wireless access points which are serving the wireless client at any given time. The Virtual Switching Group ID is dynamically created and can be reused by other client if no conflicts detected. Each virtual switching group ID is associated with a multicast address. Other virtual associations may be created between the several wireless access points as well and the invention is not limited to an embodiment that implements virtual switching groups in precisely this manner. Additionally, the wireless access points may also exchange information from their Forwarding DataBase (FDB) related to the wireless client. The FDB is generally stored at each wireless access point from the perspective of the specific wireless client. A copy of the primary party's FDB is queued at the cache when updating for that particular wireless client is necessary. Similarly, the wireless access points may exchange authentication information which may be used to speed up the re-authentication process. Other types of information may be exchanged as well and the invention is not limited to exchanging only these several discussed pieces of information.

As discussed above, the wireless client may communicate with multiple wireless access points simultaneously, for example by using one of the wireless access points as the primary wireless access point for a certain type of communication and another of the wireless access points as the primary wireless access point for another type of communication. The particular access point for a given data flow may be selected based on a number of different criteria, including the source/destination address, bandwidth, proximity to destination, and numerous other factors. Additionally, the wireless access points may cooperatively transmit information to the wireless client to enable enhanced data rates to be provided to the wireless client. For example, assume that a given wireless client has requested a large data file. By splitting the file into two separate pieces and transmitting half of the file from each wireless access point to the wireless client, the wireless client may receive the data twice as fast. The invention is not limited to this particular example as other mechanisms of simultaneously communicating may additionally be possible.

According to an embodiment of the invention, a given wireless client may associate with one primary (active transmitting) wireless access point and multiple secondary (standby) wireless access points, or may associate with multiple primary wireless access points and zero, one, or multiple secondary wireless access points. The invention is not limited to any particular number of each of the types of wireless access points to which associations may be formed.

Figure 4:
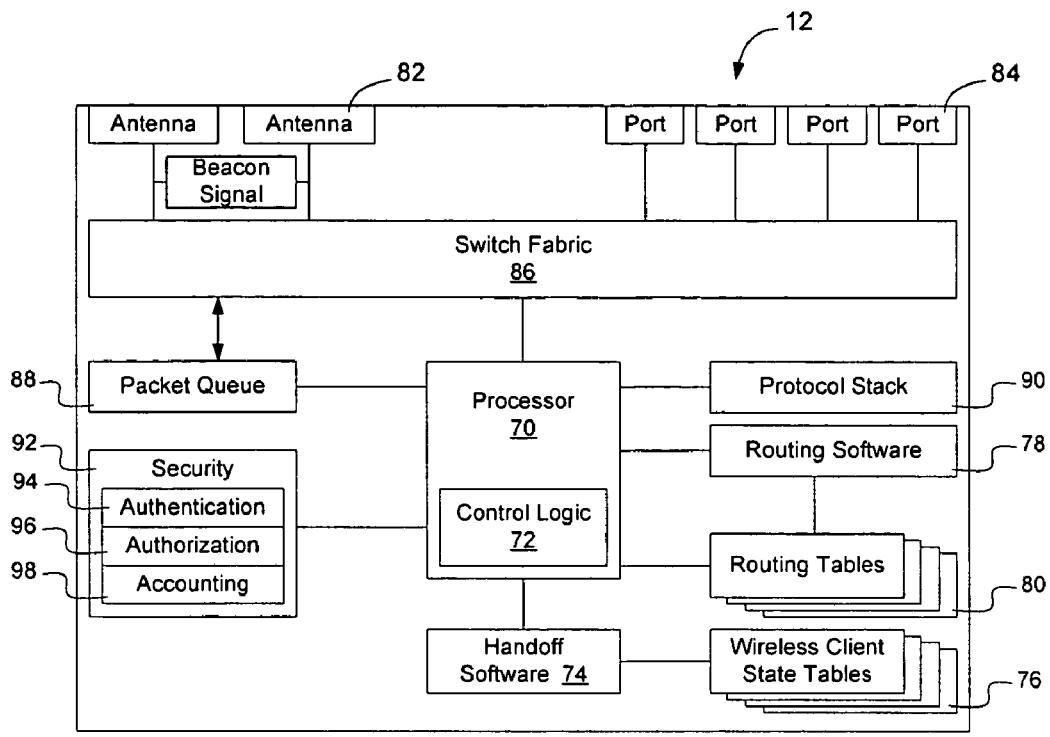
FIG. 4 is a functional block diagram of a wireless access point according to an embodiment of the invention.

FIG. 4, illustrates a wireless access point 12 according to an embodiment of the invention. As shown in FIG. 4, the wireless access point 12 generally includes a processor 70 containing control logic 72 configured to perform functions described above to enable the wireless access point to host communications with wireless clients on the wireless network. The processor may interface handoff software 74 configured to enable the wireless access point to be affiliated with wireless clients, wireless client state tables 76 containing information associated with communication sessions for particular wireless clients. Additionally, when the wireless access point is configured to make routing decisions on the network, the wireless access point may also include routing software 78 and routing tables 80 containing routing information to enable the wireless access point to route protocol data units on the network. Other software subsystems may be included as well and the invention is not limited to an embodiment including only these several subsystems. Where dedicated hardware or firmware is used to implement the functionality described above, dedicated circuits such as ASICs or FPGAs may be used in place of the software modules.

The wireless access point 12 includes wireless antennae 82 configured to enable the wireless access point to communicate with the wireless clients using one or more wireless protocols. Additionally, where the wireless access points are configured to communicate with each other using a wireless protocol, the wireless access point may include one or more additional wireless antennae configured to communicate with the other wireless access points. Optionally, one or more wireline ports 84 may also be provided to enable the wireless access point to be connected to a wired network.

A switch fabric 86 under the control of the processor 70, may be provided to interconnect the ports and antennae and direct packets between these several interfaces. The switch fabric may be supported by a packet queue 88 configured to store packets or other protocol data units temporarily pending transmission over an appropriate interface.

The wireless access point may be provided with one or more components (hardware and/or software) to enable it to communicate more effectively on the communication network. In the embodiment illustrated in FIG. 4, the wireless access point includes a protocol stack 90 containing data and instructions configured to enable the wireless access point to participate in protocol exchanges on the network. The wireless access point may also include a security module 92 containing an authentication module 94 configured to authenticate users, devices, or connections on the network, an authorization module 96 configured to determine appropriate authorization control information to prevent unauthorized access to the network, and an accounting module 98 configured to enable accounting entries to be established for communication sessions on the network. Other modules may be included as well and the invention is not limited to a particular implementation of the network device. The invention is thus not limited to a wireless access point having this particular selection of functional modules as other modules may be employed as well.

Figure 5:
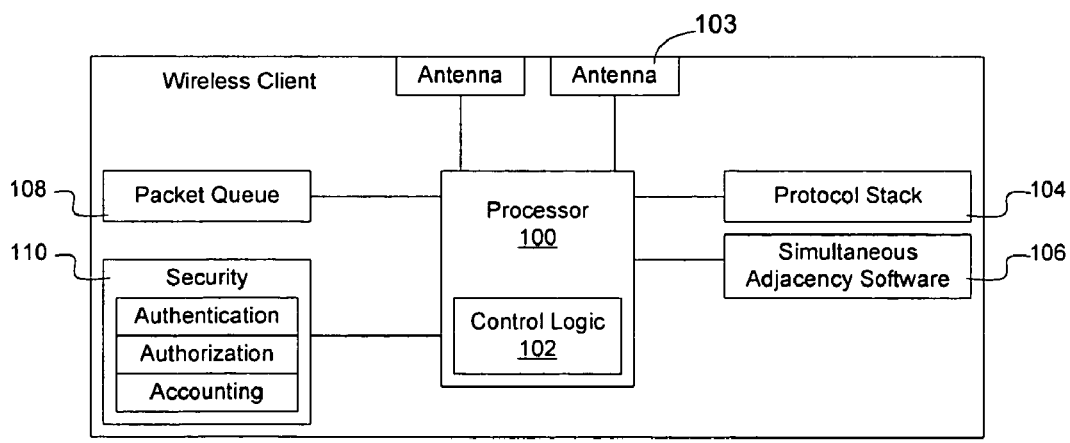
FIG. 5 is a functional block diagram of a wireless client according to an embodiment of the invention.

FIG. 5 illustrates a wireless access device that may function as a wireless client on the network 10 described above in connection with FIGS. 1-3 and interact with the wireless access point described above in connection with FIG. 4. As shown in FIG. 5, the access device 16 includes a processor 100 containing control logic 102 configured to enable it to implement the functions described above so that it is capable of establishing multiple simultaneous adjacencies on the network 10.

In the embodiment shown in FIG. 5, the wireless access device 16 includes software modules configured to enable it to form affiliations with two or more adjacent wireless access points. For example, the wireless access device 16 may include a protocol stack 104 containing data and instructions to enable the wireless client to engage in protocol exchanges on the network. Additionally, simultaneous adjacency software 106 may be included to enable the wireless client to perform the functions ascribed to the wireless client in the description set forth above with respect to FIG. 3. Optionally, the simultaneous adjacency software 106 may be subsumed into the protocol stack or merged with the protocol stack so that a single piece of software or a single software module may be provided to govern how the wireless client behaves on the wireless network and how the wireless client performs handoffs on the wireless network. The invention is not limited by the manner in which the wireless client is configured to implement the functionality ascribed to it as set forth above.

Optionally, the wireless client may also include several other modules configured to enable it to have increased functionality and otherwise interact with the wireless access points. For example, the wireless client may include a packet queue 108 configured to store protocol data units for transmission onto the network and/or that have been received from the network. A security module 110 may also be provided to enable the wireless client to authenticate itself on the network, establish its authorization information to communicate on the network, and allow accounting information to be provided on the network. Other or different modules may be used as well and the invention is not limited to an embodiment that includes this particular selection of components.

The functions described above may be implemented as a set of program instructions that are stored in a computer readable memory within the network element and executed on one or more processors within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of forming multiple simultaneous active wireless connections between a wireless client and two or more separate wireless access points, the method comprising the steps of:

obtaining, by the wireless client, a first primary active affiliation between the wireless client and a first primary wireless access point in a first wireless local area network, the first primary wireless access point providing ongoing communication services to the wireless client on the first wireless local area network by sending data to the wireless client and receiving data from the wireless client on the first primary active affiliation on the first wireless local area network;

obtaining, by the wireless client, a second primary active affiliation between the wireless client and a second primary wireless access point in the first wireless local area network, the second primary wireless access point providing ongoing communication services to the wireless client on the first wireless local area network by sending data to the wireless client and receiving data from the wireless client on the second primary active affiliation on the first wireless local area network;

simultaneously maintaining and using, by the wireless client, the first primary active affiliation between the wireless client and the first primary wireless access point in the first wireless local area network and the second primary active affiliation between the wireless client and the second primary wireless access point in the first wireless local area network, during a period of operation of the wireless client when the wireless client is not engaging in a handoff process between access points on the first primary wireless local area network;

wherein the first primary wireless access point and the second primary wireless access point are both part of the first wireless local area network.

2. The method of claim 1, further comprising the step of locating additional wireless access points by scanning beacon signals from other wireless access points.

3. The method of claim 1, wherein the step of obtaining the first primary active affiliation comprises generating a first request to send message and sending the first request to send message to the first primary wireless access point.

4. The method of claim 3, wherein the step of obtaining the second primary active affiliation comprises generating a second request to send message and sending the second request to send message to the second primary wireless access point.

5. The method of claim 4, wherein the second request to send message includes identification information about the first primary wireless access point.

6. The method of claim 1, further comprising simultaneously receiving first data by the wireless client from the first primary wireless access point and receiving second data from the second primary wireless access point.

7. The method of claim 6, wherein the step of receiving the second data from the second access point is initiated before the step of receiving the first data from the first wireless access point has been completed.

8. The method of claim 6, wherein the wireless client has a first IP address associated with the first primary active affiliation and a second IP address associated with the second primary active affiliation.

* * * * *